United States Patent [19]

Hsia et al.

[11] Patent Number: 4,484,394
[45] Date of Patent: Nov. 27, 1984

[54] CURVE LENGTH MEASURE MEANS

[76] Inventors: Chih-Yu Hsia; Chih-Hung Hsia, both of 1830 Fern Hollow Dr., Diamond Bar, Calif. 91765

[21] Appl. No.: 439,911

[22] Filed: Jan. 14, 1983

[51] Int. Cl.³ .............................................. G01B 5/20
[52] U.S. Cl. .................................. 33/484; 33/125 R; 33/173
[58] Field of Search ................. 33/173, 483, 484, 486, 33/125 R, 1 C, 1 R, 27 C, 137, 138, 158

[56] References Cited

FOREIGN PATENT DOCUMENTS 561817 6/1944 United Kingdom ............... 33/27 C

Primary Examiner—Harry N. Haroian

[57] ABSTRACT

A main accessory and a pair of optional end auxiliaries can be added onto a triangular scale or a ruler to measure the length of a curve. The main accessory can provide a movable pivot for the triangular scale or the ruler. The end auxiliaries can assure the ability of slide of the main accessory on the ruler. The end auxiliaries can also assist the pivoting ability of the triangular scale or the ruler.

2 Claims, 12 Drawing Figures

CURVE LENGTH MEASURE MEANS

BACKGROUND OF THE INVENTION

Field Of Invention

This invention relates to accessories for rulers and scales for measuring length of curves.

SUMMARY OF THE INVENTION

This invention relates to new and useful accessories for scales and rulers for improving their convenience and efficiency in measuring the length of curves. Consequently, one object of the present invention is to provide means which will not only offer convenience but also give efficiency in measuring the length of a curve by a straight ruler. Another object of this invention is to provide means which will give convenience and efficiency in measuring the length of a curve by a scale.

The above mentioned objects of the invention, along with others, as well as the advantages thereof, will be fully described as the specification proceeds.

The invented means for both of scales and rulers contains a main accessory of this kind which can be slided on the scale/ruler when it is operated to do so and which can offer a substance that acts as a fixed pivot for the whole scale/ruler system to be pivoted.

The invented means for scales and rulers also provides an auxiliary device of this kind which can increase the ability for the scale/ruler to be pivoted freely and also ensure the ability of sliding of the main accessory on the ruler. This auxiliary device is mandatory in use for the rulers but is optional in use for the scales.

The basic idea of using this invented means is that the invented means will treat a continuous curve as compositions of many short straight line segments. These short straight line segments can be measured and their measurements can be summed up automatically on the scale/ruler. The ability for the scale/ruler to be pivoted enables the selection of straight line segments along a curve. The ability of sliding the main accessory on a scale/ruler provides the means with measuring, identifying, changing the position of pivot for next measuring and summing up the measurements. After a series of consecutive pivotings of the scale/ruler and slidings of the main accessory on the scale/ruler along a curve, the length of the curve is measured and can be read directly from the scale/ruler.

BRIEF DESCRIPTION OF THE DRAWINGS

The invention is illustrated by reference to the accompanying drawings, in which.

DETAILED DESCRIPTION

Figure 1:
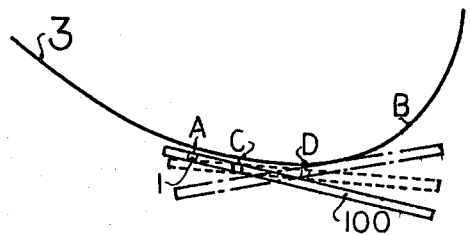
FIG. 1 is an example of the use of this invention.
Figure 2:
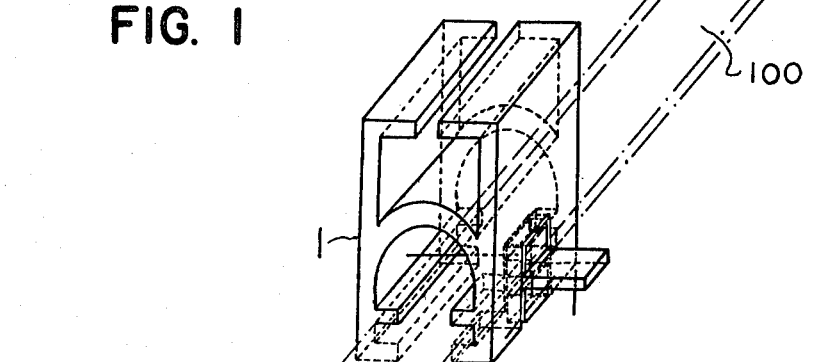
FIG. 2 is a perspective view of the invention which is proposed for the rulers. A main accessory and two end auxiliaries are shown in this figure.
Figure 3:
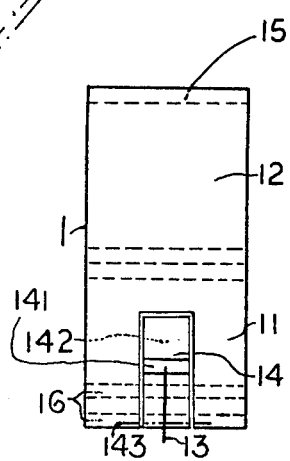
FIGS. 3 and 4, respectively, are elevation and side views of the main accessory which is proposed for the rulers.
Figure 4:
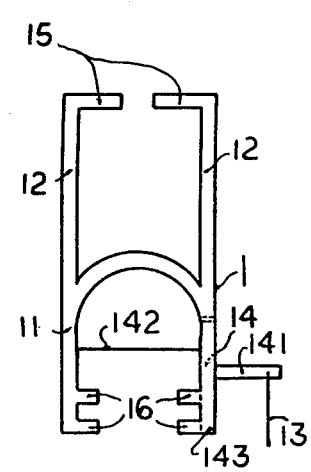
Figure 5:
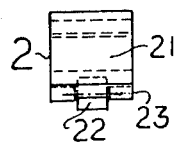
FIGS. 5 and 6, respectively, are elevation and side views of the end auxiliary which is proposed for the rulers.
Figure 6:
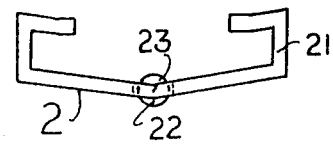

There are two invented means which are simultaneously described in this section. One of these two invented means is specifically designed for the rulers. The other invented means is designed for the scales. These two invented means are very similar. Therefore, the description is applicable to both invented means, unless otherwise sepcified.

The invented means for the ruler 100 or for the scale 100 composes of a main accessory 1 with or without a pair of end auxiliaries 2. The invented means can be made of any suitable material.

The main accessory 1 comprises a clamp 11, two clamp ears 12, one pivot pointer 13, one pivot pointer seat 14 and a pair of optional devices—the clamp ear bends 15.

Figure 12:
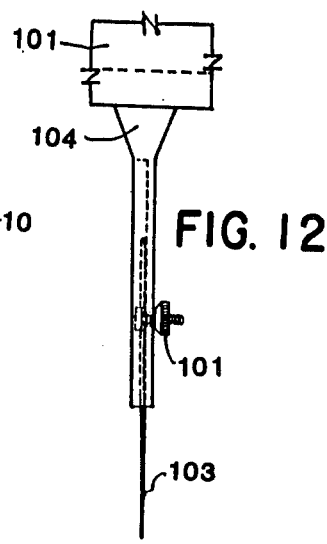
FIG. 12 is the side view of an example of the pivot pointer. Only portion of the main accessory is shown in the figure.

The clamp 11 is a clamp of any suitable shape and size and is used to tightly hold the main accessory 1 on the ruler 100 or on the scale 100 by its edges. Each of the two clamp ears 12 with any suitable shape and size is fixed on each limb of the clamp 11. Depending on the type of material with which the clamp 11 is made, two clamp ear bends 15 are optionally attached to the free ends of the clamp ears 12. The purpose of adding these two clamp ear bends 15 is to control the spacing between two clamp ears 12. This will prevent clamp 11 from over stressed due to pushing the clamp ears 12 too hard toward each other. When the clamp 11 is made of brittle material, the clamp ear bends 15 shall be installed. The pivot pointer 13 basically is a sharp substance which can indicate a precise point and which can serve as a pivot when necessary. The pivot pointer 13 can be anything which is strong and sharp such as a piece of pencil lead, a needle, etc. The pivot pointer 13 can be of fixed length of adjustable in length. FIG. 12 is an example of the pivot pointer whose length can be adjusted by manipulating the screw and rod 101. The pivot pointer is connected to the pivot pointer seat 14 which has the relationship with the clamp 11 as described below.

Figure 8:
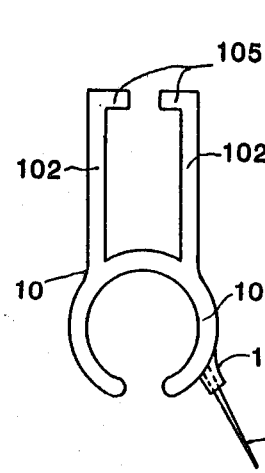
FIGS. 8 and 9, respectively, are side and elevation views of the main accessory which is proposed for the scales.
Figure 9:
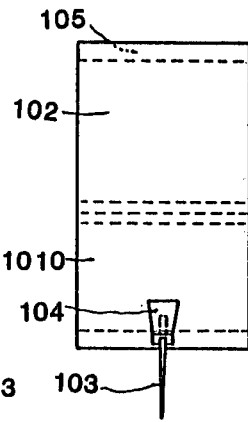
Figure 7:
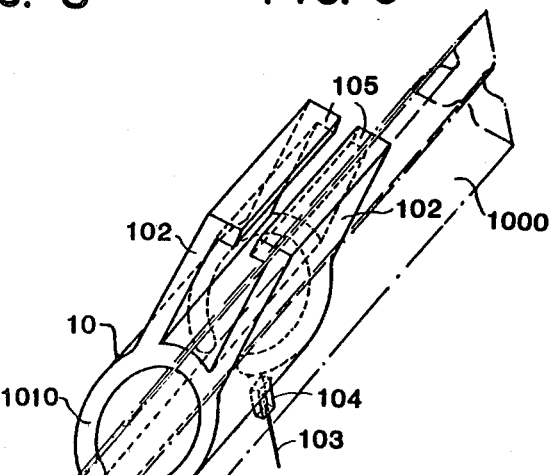
FIG. 7 is a perspective view of the invention which is proposed for the scales. The end auxiliary is not shown in the figure.
Figure 10:
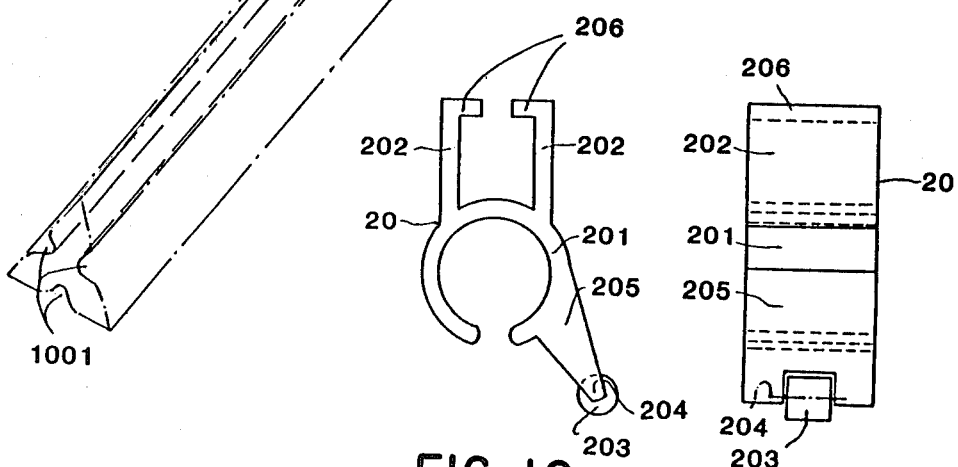
FIGS. 10 and 11, respectively, are side and elevation views of the end auxiliary which is proposed for the scales.
Figure 11:
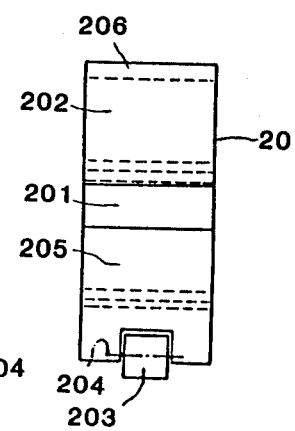

The pivot pointer seat 14 of the main accessory 1 designed for the scale can be the clamp 11 itself or a substance with any suitable shape and size on one limb of the clamp 11. An example of the pivot pointer seat 14 for the main accessory of a scale is shown in FIGS. 7, 8 and 9.

The pivot pointer seat 14 of the main accessory 1 designed for the ruler comprises a "T" shape part 141, a string 142 and a pin axis 143. An opening is on one limb of the clamp 11. The "T" shape part 141 is formed by three plates. Namely, they are the lower plate, the upper plate and the third plate. These three plates rigidly join together to each other with the third plate extruding from the plane formed by the lower plate and the upper plate. The "T" shape part 141 is connected to the clamp 11 in its opening by the pin axis 143 at the lowest edge of the lower plate. The string 142 is connected to the upper plate of the "T" shape part 141. The other end of the string 142 is connected across the hollow portion inside the clamp 11 to the other limb of the clamp 11. The pivot pointer 13 is fixed on the third plate of the "T" shape part 141 which is outside of the clamp 11. A pair of ruler guards 16 is on the inner edges of the clamp 11. Basically, these two ruler guards 16 are notches which can constrain the ruler 100 in its correct position in the main accessory 1. The length of the string 142 is so selected that the string 142 will pull back the upper plate of the "T" shape part 141 when the clamp ears are pushed toward each other. The pulling back of the upper plate will result in the raising of the third plate of the "T" shape part 141 and consequently raise the pivot pointer 13.

The end auxiliary 2 designed for the ruler 100 comprises of a clamp 21, a wheel 22 and a wheel axial pin 23. The clamp 21 which has an opening at its central portion can be any suitable shape and size. The wheel 22 is connected to the clamp 21 in its opening by the wheel axial pin 23.

The end auxiliary 2 designed for the scale 100 comprises a clamp 201, two clamp ears 202, a wheel 203, a wheel axial pin 204, a wheel seat 205 and a pair of optional device—the clamp ear bends 206. Each of the two clamp ears 202 is connected to each of the two limbs of the clamp 201. Same as those for the main accessory 1, the clamp ear bends 206 are optionally connected to the free ends of the clamp ears 202 and are recommended when the clamp 201 is made of brittle material. The wheel seat 205 extrudes outwardly from one limb of the clamp 201. There is an opening at the tip of the wheel seat 205. The wheel 203 is connected to the wheel seat 205 in its opening by the wheel axial pin 204.

Before using a ruler 100 to measure the length of a curve 3, firstly, the main accessory 1 and two end auxiliaries 2, designed for the ruler, must be installed. Each end auxiliary 2 is installed on each end of the ruler 100. They are so installed that their wheels 22 are under the ruler 100. Two clamps 21 will tightly hold two end auxiliaries 2 on the ruler 100. The wheels 22 are so constructed on clamps 21 that they will not allow longitudinal movement of the ruler after the installation of the end auxiliaries 2. The main accessory 1 is installed with its two clamp ears 12 above the ruler 100 and the ruler 100 is seated in the notches of the ruler guards 16. When the clamp 11 is tightly cramped on the ruler 100, the ruler 100 exerts a reaction force on the pivot pointer seat 141. Because the pivot pointer seat 141 is eccentrically connected with its lowest edge to the edge of the clamp 11 by the pin axis 143, the aforementioned reaction force generates a torque on the pin axis 143 for the pivot pointer seat 141. This torque will enforce a proper contact between the pivot pointer 13 and a point on the curve 3, as long as the length of the pivot pointer 13 is selected or adjusted properly. The wheel 22 of the end auxiliaries 2 plus the proper contact between the pivot pointer 13 and the curve 3 allow the whole ruler system (100, 1 and 2) be turned with the pivot pointer 13 as the axis. This implies that the choice of the dimensions of the components for the end auxiliaries 2 must be adequate so that there will be spacings between the wheel 22 and the ruler 100, also, between the lowest edges of the clamp 11 of the main accessory 1 and the plane where the curve 3 is on. When two clamp ears 12 of the main accessory 1 are pushed toward each other, the ruler 100 can be released from the clamp 11 and hence the aforementioned torque which acted on the pin axis 143 will vanish. The distance between two limbs of the clamp 11 will increase and the upper plate of the "T" shape part 141 will be pulled inwards the clamp 11 by the string 142 of fixed length. The inward movement of the upper plate of the "T" shape part 141 will raise its third plate where the pivot pointer 13 connects to the "T" shape part 141. This will then release the contact between the pivot pointer 13 and the curve 3. When two clamp ears 12 are pushed close enough, the main accessory 1 can be slided on the ruler 100. The ruler guards 16 ensure that the ruler 100 always compatible with the main accessory 1 even while it is sliding along the ruler 100.

Before using the invented means for the scales to measure the length of a curve 3, the main accessory 1 designed for the scale 100 must be installed. The installation of the end auxiliaries 2 for the scale 100 is optional. Two edges of the clamp 11 will tightly cramp the main accessory 1 on the scale 100 at the two slots 1001. When the scale 100 is tilted sidewards enough, the pivot pointer 13 will contact the curve 3 and the whole scale 100 will be tilted above the plane where the curve 3 is on. This enables the scale 100 to be turned around with the pivot pointer 13 as an axis. The installed end auxiliaries 2 can make the turning of the scale 100 more easily because of the aids of their two wheels 203. When two clamp ears 12 of the main accessory 1 are pushed toward each other, the scale 100 is slightly released from the clamp 11 and the main accessory 1 can be slided on the scale 100 when it is not tilted. This means that the length of the pivot pointer 13 is so selected or adjusted, depending on whether the pivot pointer 13 is an adjustable type or not, that before tilting of the scale the pivot pointer 13 will point but will not contact the curve 3 or its plane. In this case, the pivot pointer 13 will not restrict the ability of sliding of the main accessory 1 on a scale 100 when it is not tilted. When the end auxiliaries 2 are used, they should be installed at the ends of the scale 100 with two wheels 203 at the same side of the scale. It is also the same side where the pivot pointer 13 is at. Like the main accessory 1, the end auxiliaries 2 are also cramped on the scale 100. The functions of the clamp ears 202 and the clamp ear bends 206 are the same as those of the main accessory 1. The dimensions of the components of the end auxiliary 2 are so selected that the end auxiliary 2 will, after the scale being tilted, aid but will not jeopardize the ability of pivoting of the scale.

The basic idea of using this invented means to measure the length of a curve is that the invented means can treat a continous curve as compositions of many straight line segments. Measuring of these line segments can be done by ruler/scale and the measurements of these line segments can be summed up automatically on the ruler/scale by the invented means. FIG. 1 shows an example of using of this invented means. When one wants to measure the length between Point A and Point B on the curve 3 (FIG. 1), he/she firstly installs the invented means on a ruler or on a scale. He/She then puts the pivot pointer 13 on Point A and reads, from the ruler/scale, the starting point which is corresponding to the selected reference location on the main accessory 1. Preferably, for the ruler and for the scale, the selected reference locations on the main accessory 1 are one end of the clamp 11 and the pivot pointer 13 respectively. He/She turns the ruler/scale around so that there will be a portion of the curve 3, near Point A but between Point A and Point B, parallel to the ruler/scale. He/She slides the pivot pointer 13 to the Point C where the line segment of curve 3 tends not parallel to the ruler/scale. He/She does the same procedures again and again, i.e. turning the ruler/scale around and sliding the pivot pointer 13 to the next selected Point D and turning the ruler/scale and sliding the pivot pointer and . . . , until the Point B is reached by the pivot pointer 13. He/She then reads, on the ruler/scale, the ending point which is corresponding to the aforementioned selected reference location on the main accessory 1. The difference between the readings of the ending point and the starting point is the length of the curve between Point A and Point B.

The foregoing is considered as illustrative only of the principles of the invention. Furthermore, since numerous modifications and changes will readily occur to those skills in the art, it is not desired to limit the invention to the exact construction and operation shown and described, and accordingly all suitable modifications and equivalents may be resorted to, falling within the scope of the invention as claimed.

What is claimed as new is as follows:

1. A curve length measure means for rulers to improve their convenience and efficiency in measuring the length of curves, said curve length measure means comprising a main accessory and a pair of end auxiliaries, said main accessory comprising a clamp, two clamp ears, one pivot pointer, one pivot pointer seat, a pair of ruler guards and an optional pair of clamp ear bends, said clamp ear connecting one of its end outwardly with one limb of the said clamp and connecting optionally the other end with the said clamp ear bend, said ruler guards connecting to the edges of the said clamp, said clamp having an opening on one of its limbs, said pivot pointer seat comprising a "T" shape part, a string and a pin axis, the lower plate of the said "T" shape part being connected eccentrically with its lowest edge to the edge of one limb of the said clamp in the said opening of the said clamp by the said pin axis, one end of the said string connecting to the upper plate of the said "T" shape part inside the said clamp, the other end of the said string connecting to the opposite limb of the said clamp, the third plate of the "T" shape part connecting with the said pivot pointer outside the said clamp, said end auxiliary comprising a clamp, a wheel and a wheel axial pin, said clamp having a small opening at its central portion, said wheel axial pin conncting the said wheel to the said clamp in the said opening.

2. A curve length measure means for scales to improve their convenience and efficiency in measuring the length of curves, said curve length measure means comprising a main accessory and an optional pair of end auxiliaries, said main accessory comprising a clamp, two clamp ears, one pivot pointer, one pivot pointer seat and an optional pair of clamp ear bends, each said clamp ear connecting one of its end outwardly with one limb of the said clamp and connecting optionally the other end with the said clamp ear bend, said pivot pointer connecting to the said pivot pointer seat, said pivot pointer seat connecting to one limb of the said clamp outside the clamp, the said end auxiliary comprising a clamp, two claim ears, a wheel, a wheel axial pin, a wheel seat and an optional pair of clamp ear bends, each said clamp ear connecting one of its end outwardly with one limb of the said clamp and connecting optionally the other end with the said clamp ear bend, said wheel seat having an opening at its tip, said wheel axial pin connecting the said wheel to the said wheel seat in the said opening, said wheel seat connecting outwardly with one limb of the said clamp.

* * * * *